US010263386B1

(12) United States Patent
Sridhar et al.

(10) Patent No.: US 10,263,386 B1
(45) Date of Patent: Apr. 16, 2019

(54) FOUR-WAVE MIXING REDUCTION DUE TO RAMAN PUMPS IN OPTICAL COMMUNICATION SYSTEMS

(71) Applicant: Ciena Corporation, Hanover, MD (US)

(72) Inventors: Balakrishnan Sridhar, Ellicott City, MD (US); Jean-Luc Archambault, Ottawa (CA); Loren Berg, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/952,467

(22) Filed: Apr. 13, 2018

(51) Int. Cl.
*H01S 3/30* (2006.01)
*H01S 3/23* (2006.01)
*G02F 1/35* (2006.01)
*H01S 3/067* (2006.01)

(52) U.S. Cl.
CPC ............ *H01S 3/302* (2013.01); *G02F 1/3536* (2013.01); *H01S 3/0677* (2013.01); *H01S 3/06766* (2013.01); *H01S 3/2391* (2013.01); *G02F 2203/11* (2013.01)

(58) Field of Classification Search
None
See application file for complete search history.

(56) References Cited

U.S. PATENT DOCUMENTS

| 6,115,403 | A   | 9/2000  | Brenner et al. |           |
|-----------|-----|---------|----------------|-----------|
| 6,178,038 | B1  | 1/2001  | Taylor et al.  |           |
| 6,236,499 | B1  | 5/2001  | Berg et al.    |           |
| 6,384,963 | B2* | 5/2002  | Ackerman       | H01S 3/302 |
|           |     |         |                | 359/334   |
| 6,525,870 | B1  | 2/2003  | Cho et al.     |           |
| 6,597,495 | B2* | 7/2003  | Gertsvolf      | H04B 10/2563 |
|           |     |         |                | 359/333   |
| 6,646,786 | B1* | 11/2003 | Meli           | H01S 3/302 |
|           |     |         |                | 359/334   |
| 6,704,486 | B2* | 3/2004  | Kamiya         | G02B 6/02028 |
|           |     |         |                | 385/124   |
| 6,714,342 | B2* | 3/2004  | Islam          | H01S 3/302 |
|           |     |         |                | 359/334   |
| 6,739,727 | B2* | 5/2004  | Sekiya         | H01S 3/302 |
|           |     |         |                | 359/334   |
| 6,778,322 | B2* | 8/2004  | Kakui          | H01S 3/302 |
|           |     |         |                | 359/334   |
| 6,844,961 | B2* | 1/2005  | Odate          | H01S 3/302 |
|           |     |         |                | 359/334   |

(Continued)

*Primary Examiner* — Rhonda S Peace
(74) *Attorney, Agent, or Firm* — Clements Bernard Walker PLLC; Christopher L. Bernard; Lawrence A. Baratta, Jr.

(57) ABSTRACT

A Raman pump system for a Raman amplifier includes a plurality of primary Raman pumps each at a corresponding wavelength; and at least one pair of redundant Raman pumps including a primary redundant Raman pump at a primary wavelength and a secondary redundant Raman pump at a secondary wavelength, wherein only one of the primary redundant Raman pump and the secondary redundant Raman pump is employed based on a zero dispersion wavelength location of a fiber over which the Raman pump system operates. The secondary wavelength can be separated from the primary wavelength by at least 2 nm or 3 nm and no more than 10 nm. The Raman pump system can provide amplification across both the C Band and the L Band.

20 Claims, 16 Drawing Sheets

(56) References Cited

U.S. PATENT DOCUMENTS

| | | | |
|---|---|---|---|
| 6,888,669 B2* | 5/2005 | Onishi | H01S 3/302 359/334 |
| 7,054,060 B2* | 5/2006 | Hainberger | H01S 3/302 359/334 |
| 7,440,167 B2* | 10/2008 | Taniguchi | G02B 6/02242 359/334 |
| 8,873,135 B2 | 10/2014 | Sridhar et al. | |
| 8,885,248 B2 | 11/2014 | Bao et al. | |
| 9,148,710 B2 | 9/2015 | Archambault et al. | |
| 9,419,708 B2 | 8/2016 | Rad et al. | |
| 9,847,831 B2 | 12/2017 | Archambault et al. | |

* cited by examiner

FOUR-WAVE MIXING REDUCTION DUE TO RAMAN PUMPS IN OPTICAL COMMUNICATION SYSTEMS

FIELD OF THE DISCLOSURE

The present disclosure generally relates to optical communication systems and methods. More particularly, the present disclosure relates to systems and methods for Four-Wave Mixing (FWM) reduction due to Raman pumps in optical communication systems.

BACKGROUND OF THE DISCLOSURE

Raman amplifiers in optical communication systems operate through co- and/or counter-propagating pump wavelengths on an optical fiber with data-bearing channels. For C-band (e.g., 1530-1565 nm), the pump wavelengths are in the 1400 nm range (e.g., about 90 nm below the data-bearing channels). As capacity continues to increase and network operators are either fiber count constrained or have a high cost for adding additional fiber pairs, there is a drive to migrate to C and L dual-band systems (C+L) to increase the capacity of the link once the C-band is filled (the L-Band is 1565 nm-1625 nm). A C+L dual-band system requires a wider band distributed Raman amplifier to amplify the C and L band in the fiber. The C+L band Raman amplifier would require multiple Raman pump wavelengths (e.g., five to six) to support the wider C and L band systems. The design choice would be determined by factors such as Raman amplifier ripple, maximum available pump power, cost, etc. The pumps are distributed between 1424 nm and 1500 nm. If the fiber Zero Dispersion Wavelength (ZDW) of the transmission fiber falls in a certain region, there will be efficient Four-Wave Mixing (FWM) between the pumps because of good phase matching between pairs of pumps. The FWM can be degenerate four mixing or non-degenerate four-wave mixing.

One approach to suppress FWM between Raman pump wavelengths is to modulate the pumps out of phase. However, modulating the pumps increases the requirement of peak pump power and also increases the peak pump power in fiber, which increases the penalty from double Rayleigh backscattering at the signal wavelength.

BRIEF SUMMARY OF THE DISCLOSURE

In an embodiment, a Raman pump system for a Raman amplifier includes a plurality of primary Raman pumps each at a corresponding wavelength; and at least one pair of redundant Raman pumps including a primary Raman pump at a primary wavelength and a secondary Raman pump at a secondary wavelength, wherein only one of the primary redundant Raman pump and the secondary redundant Raman pump is configured based on a zero dispersion wavelength location of a fiber over which the Raman pump system operates. The secondary wavelength can be separated from the primary wavelength by at least 2 nm and no more than 10 nm. The secondary wavelength can be separated from the primary wavelength by at least 3 nm and no more than 10 nm. The Raman amplifier can provide amplification across both the C Band and the L Band. The zero dispersion wavelength can be measured and the at least one pair of redundant Raman pumps are configured based thereon. An Optical Channel Monitor (OCM) can determine a presence of Four Wave Mixing (FWM) products in an output of the Raman amplifier based on different combinations of the at least one pair of redundant Raman pumps, for selection of the at least one pair of redundant Raman pumps. The plurality of primary Raman pumps can include 6 pumps and the at least one pair of redundant Raman pumps can include one primary Raman pump and one secondary Raman pump. The plurality of primary Raman pumps can include 5 pumps and the at least one pair of redundant Raman pumps can include one primary Raman pump and one secondary Raman pump. The plurality of primary Raman pumps can include 5 pumps and the at least one pair of redundant Raman pumps can include two primary Raman pumps and two secondary Raman pumps. The at least one pair of redundant Raman pumps can be located at about 1450 nm. The at least one pair of redundant Raman pumps can be located at about 1500 nm.

In another embodiment, a method of operating a Raman pump system for a Raman amplifier includes operating a plurality of primary Raman pumps each at a corresponding wavelength; and operating only one of a primary redundant Raman pump at a primary wavelength and a secondary redundant Raman pump at a secondary wavelength in a pair of redundant Raman pumps based on a zero dispersion wavelength location of a fiber over which the Raman pump system operates. The secondary wavelength can be separated from the primary wavelength by at least 2 nm and no more than 10 nm. The secondary wavelength can be separated from the primary wavelength by at least 3 nm and no more than 10 nm. The Raman amplifier can provide amplification across both the C Band and the L Band. The method can further include measuring the zero dispersion wavelength and configuring the pair of redundant Raman pumps based thereon. The method can further include determining a presence of Four Wave Mixing (FWM) products in an output of the Raman amplifier based on different combinations of pumps in the Raman amplifier, for selection of the redundant Raman pump. The pair of redundant Raman pumps can be located at about 1450 nm. The pair of redundant Raman pumps can be located at about 1500 nm.

In a further embodiment, a dual C-Band and L-Band Raman pump system for a Raman amplifier includes a plurality of Raman pumps connected to a multiplexer, wherein the plurality of Raman pumps include a plurality of primary Raman pumps each at a corresponding wavelength and at least one pair of redundant Raman pumps including a primary redundant Raman pump at a primary wavelength and a secondary redundant Raman pump at a secondary wavelength, wherein one of the primary redundant Raman pump and the secondary redundant Raman pump selectively operates based on a zero dispersion wavelength location of a fiber over which the Raman pump system operates.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for Four-Wave Mixing (FWM) reduction due to Raman pumps in optical communication systems. Specifically, the systems and methods include a Raman amplifier with various Raman pumps including secondary pumps at different wavelengths from primary pumps. The primary pump wavelength and corresponding secondary pump wavelength have a wavelength difference, such as at least 2 nm, at least 3 nm, etc. and only one of these pumps is used based on the zero dispersion wavelength location on a particular fiber.

Figure 1:
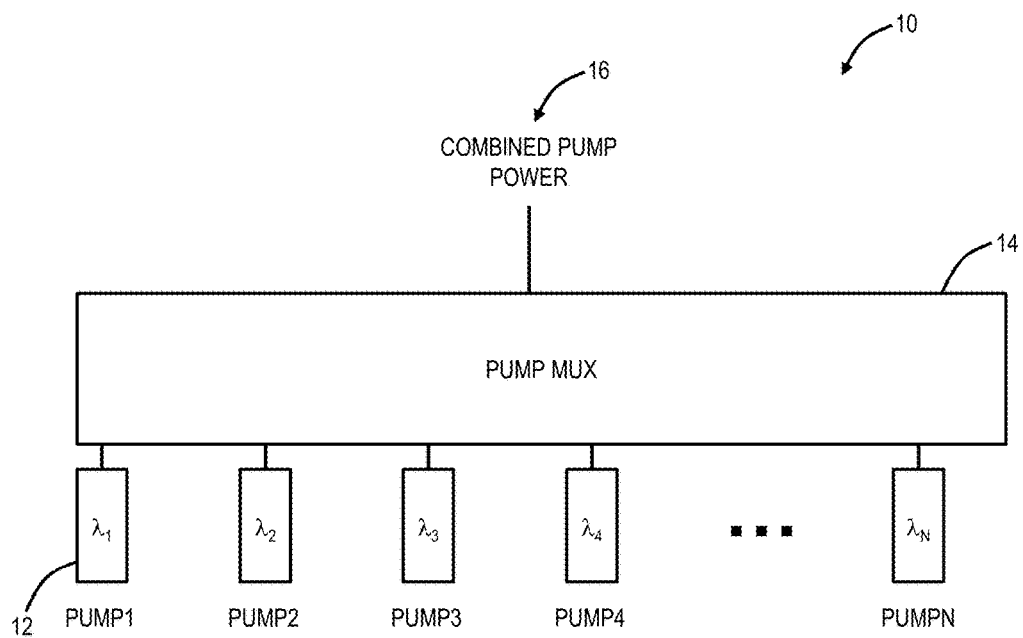
FIG. 1 is a block diagram of a Raman pump for a Raman amplifier.

FIG. 1 is a block diagram of a Raman pump system 10. The Raman pump system 10 includes a plurality of pumps 12, namely N pumps 12, which are high-powered lasers with wavelengths at $\lambda_1$, $\lambda_2$, $\lambda_N$. The pumps 12 are input into a pump multiplexer 14 which performs wavelength division multiplexing and/or polarization multiplexing of the pump wavelengths to provide an output 16 which has the combined pump power thereon. The output 16 is injected into an optical fiber in a co- or counter-propagating manner, forming a Raman amplifier (i.e., a Raman amplifier includes the Raman pump and the optical fiber). The Raman pump system 10 can support both the C+L band for amplification. As described herein, a C+L dual-band system requires a wider band distributed Raman amplifier to amplify the C and L bands in the fiber. The C+L band Raman pump system 10 requires multiple Raman pump 12 wavelengths (e.g., five to six) to support the wider C and L band systems. The design choice of pump wavelengths, power, etc. is determined by factors such as Raman amplifier ripple, maximum available pump power, cost, etc.

Figure 2:
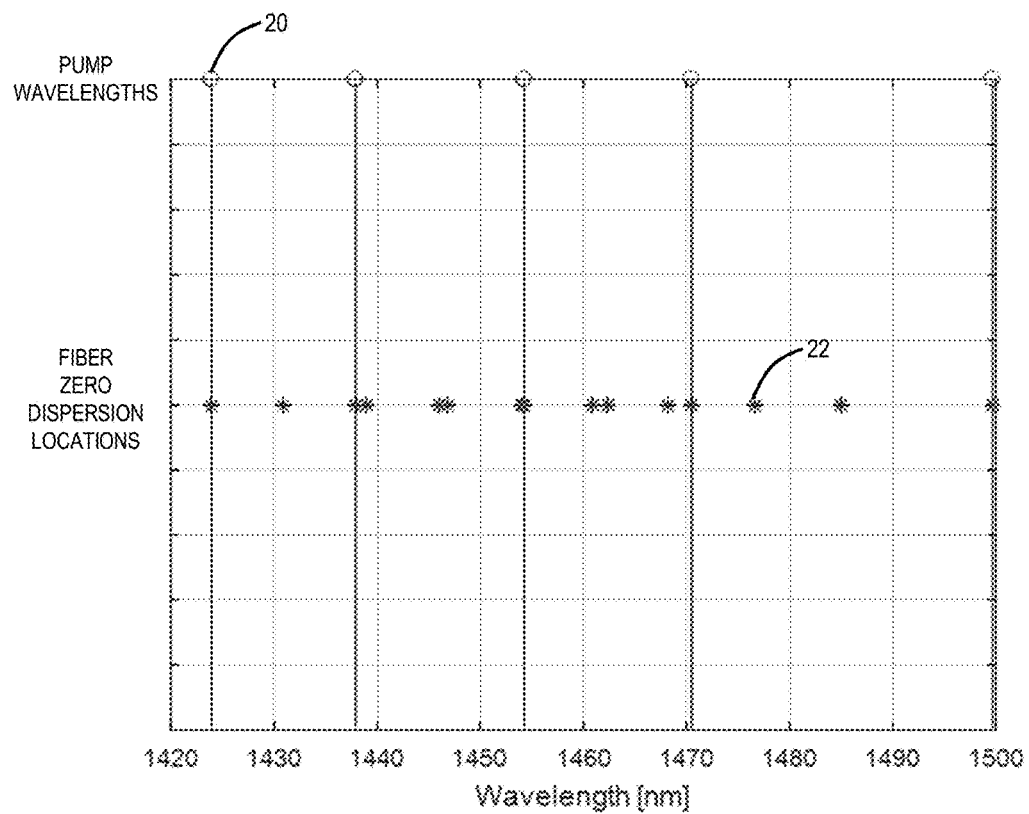
FIG. 2 is a graph of pump wavelength locations and fiber zero dispersion wavelength locations for a five pump C+L Raman amplifier.
Figure 3:
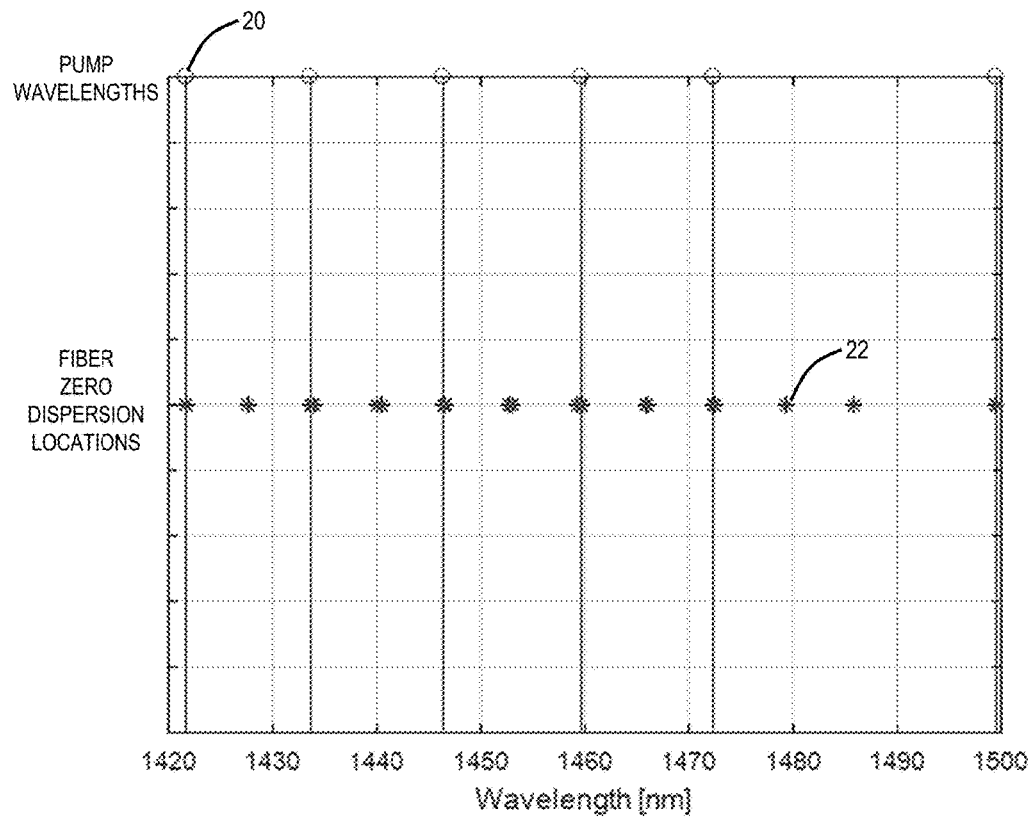
FIG. 3 is a graph of pump wavelength locations and fiber zero dispersion wavelength locations for a six pump C+L Raman amplifier.

FIG. 2 is a graph of pump wavelength locations and problematic fiber zero dispersion wavelength locations for a five pump 12 C+L Raman pump system 10. FIG. 3 is a graph of pump wavelength locations and problematic fiber zero dispersion wavelength locations for a six pump 12 C+L Raman pump system 10. In FIGS. 2 and 3, the pump wavelength locations 20 are illustrated as lines with a stem and the problematic fiber zero dispersion locations 22 are illustrated as stars. The fiber zero dispersion locations 22 are where pump-to-pump FWM has maximum efficiency. The fiber zero dispersion locations 22 are shown for both degenerate (ZDW matches the wavelength of a particular pump 12) and non-degenerate (ZDW is between two different pump 12 wavelengths) cases. The FWM efficiency would drop off significantly if the ZDW is a few nanometers away from these bad locations 22. Note, the problematic fiber zero dispersion locations 22 shown can correspond to different fiber types. The zero dispersion of a fiber can vary due to the fiber design and also variations in the manufacturing process.

Figure 4:
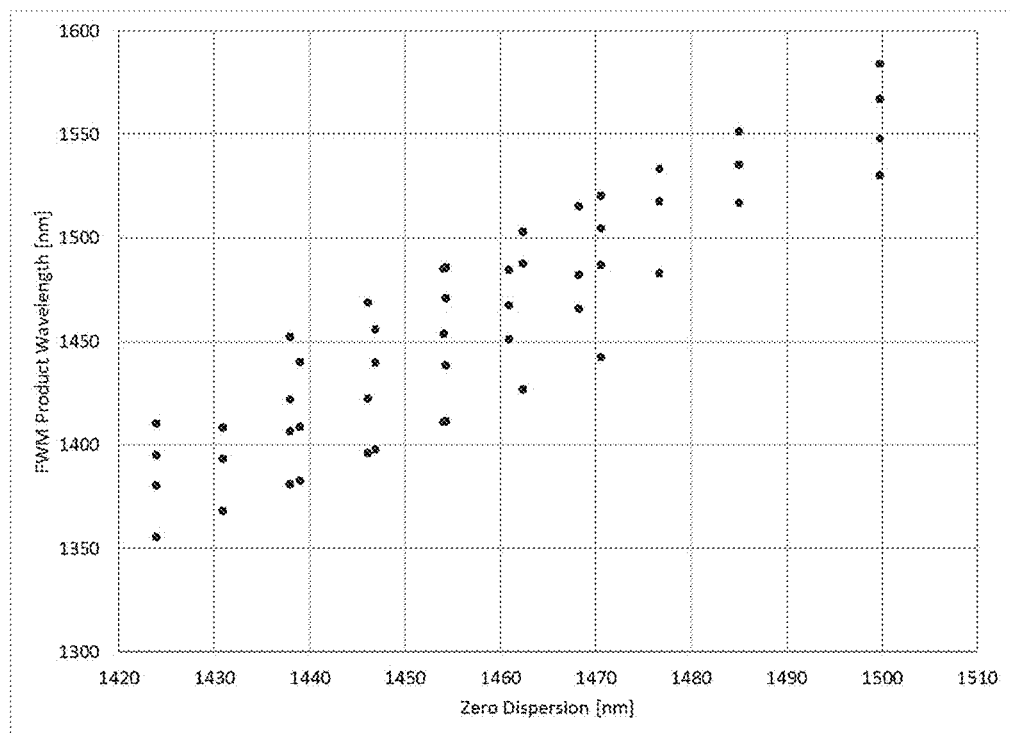
FIG. 4 is a graph of all the possible FWM product distribution for the five pump C+L Raman amplifier.
Figure 5:
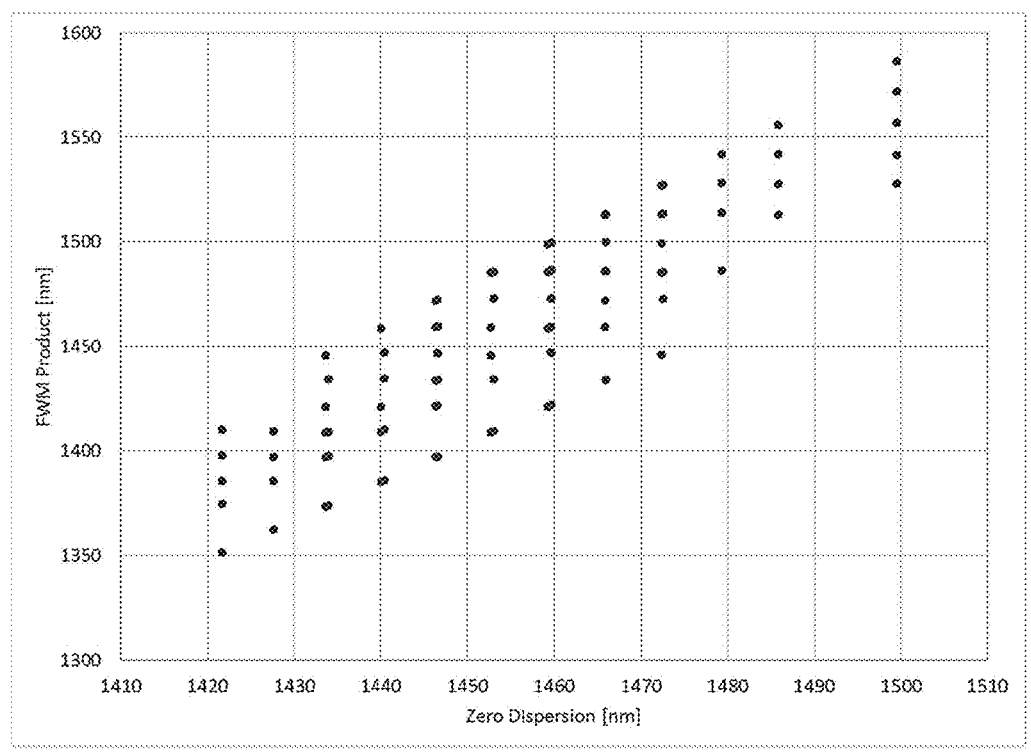
FIG. 5 is a graph of all the possible FWM product distribution for the six pump C+L Raman amplifier.

FIG. 4 is a graph of all the possible FWM product distribution for the five pump 12 C+L Raman pump system 10. FIG. 5 is a graph of all the possible FWM product distribution for the six pump 12 C+L Raman pump system 10. The FWM product wavelengths are plotted as a function of the fiber zero dispersion locations 20.

If there is FWM between the Raman pumps 12, it can have the following impact on the Raman pump system 10 performance. First, the pump 12 wavelengths affected by FWM are partially depleted which impacts the gain spectrum of the Raman pump system 10. This can lead to an increase in gain ripple and reduction of average gain across the signal band. Second, some of the FWM products can interfere with the performance of the Optical Service Channel (OSC) channel or the payload channels in the system if they lie within the OSC or C and L band amplifier bandwidth.

Figure 6:
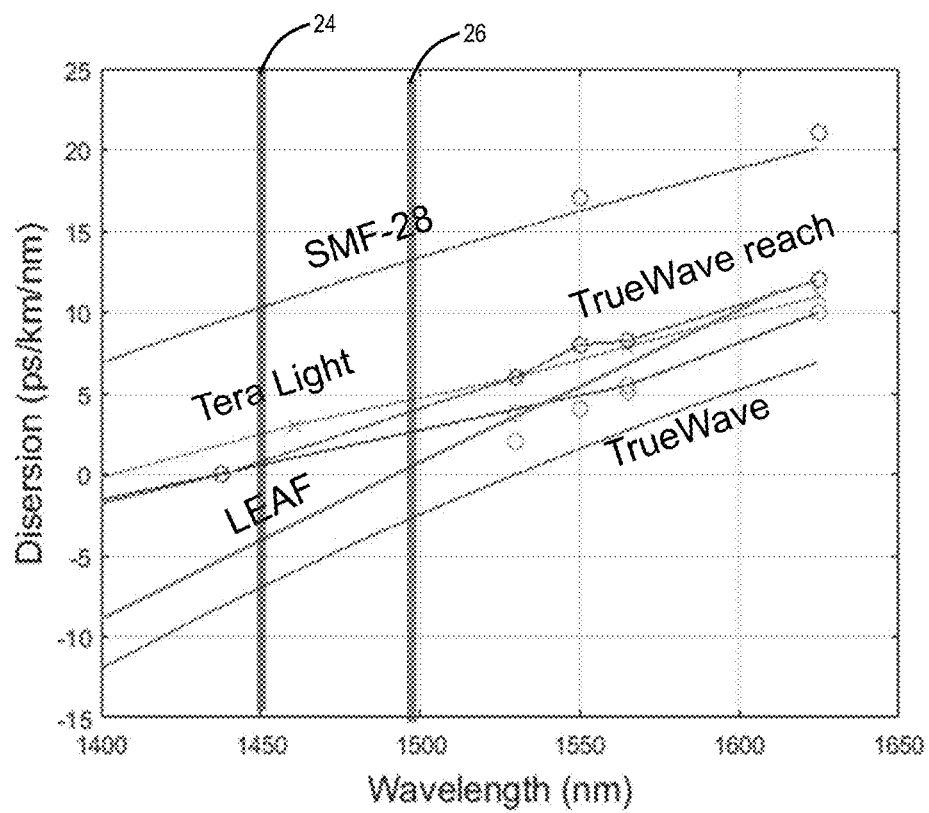
FIG. 6 is a graph of fiber dispersion slope and zero dispersion regions for various fiber types.

FIG. 6 is a graph of the nominal fiber dispersion and the associated slope and zero dispersion regions for various fiber types. The fiber zero dispersion wavelength 22 depends on fiber type. Non-Dispersion Shifted Fiber (NDSF) fiber (also referred to as Single Mode Fiber-28) has high dispersion in the pump and signal region of the fiber. Reduced slope Non-Zero Dispersion Shifted Fiber (NZDSF) fibers such Truewave Reduced Slope (TWRS) (available from OFS) and Teralight (available from Draka) have zero dispersion region in the 1420 nm-1465 nm range. Other NZDSF fibers such as Enhanced Large Effective Area Fiber (ELEAF) (available from Corning) and Truewave Classic (TWC) (available from OFS) have zero dispersion in the 1480 nm-1510 nm range.

For example, when a pump 12 is in a region 24 around 1450 nm, a penalty is seen where the gain spectrum of a Raman amplifier using the Raman pump system 10 is changed due to the FWM term created when the fiber ZDW is ~1450 nm (e.g., TWRS). When a pump 12 is in a region 26 around 1500 nm, a penalty is seen where the FWM term is Rayleigh backscattered and degrades signal bands Optical Signal-to-Noise Ratio (OSNR) when the fiber ZDW is ~1500 nm (e.g., LEAF), and a $2^{nd}$ pump is present at a lower wavelength, e.g. 1455 nm which creates a FWM product within the signal band at ~1548 nm.

Also, the fiber zero dispersion location 22 for a fiber type has a range of distribution due to variations in manufacturing process. In a large network, the fiber zero dispersion locations 22 distribution is probabilistic. A few spans of fiber could have their fiber zero dispersion wavelengths line up with or close to the pump 12 wavelength. The resultant backscattered FWM product would couple with the signal and cause errors on some channels. These kind of problems would be difficult to isolate, because they could occur at any of the spans through which the channels propagate. Also, since the FWM products affect only certain channels, the issue may not be visible until the network is sufficiently loaded.

Figure 7:
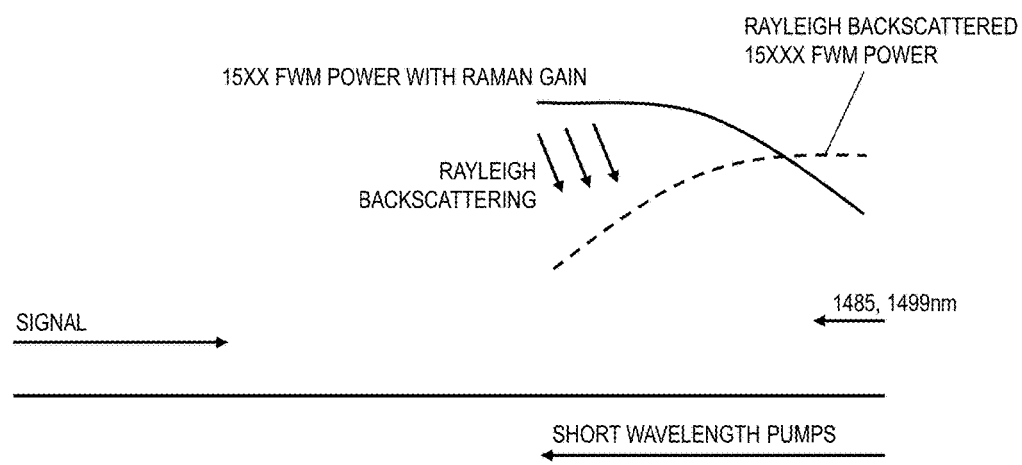
FIG. 7 is a diagram of a single Rayleigh back-scattered FWM product into the signal.

FIG. 7 is a diagram that describes the mechanism by which a single Rayleigh back-scattered pump to pump FWM product is coupled into the signal. In this example, the long wavelength pump (1499 nm and 1485 nm) of the Raman pump system 10 propagates in ELEAF fiber with zero dispersion close to 1499 nm to produce FWM products (Stokes component) in the blue end of the C-band amplifier. The FWM product propagates in the direction of the pumps 12 and is amplified by Raman amplification in the fiber from the short wavelength Raman pumps 12. The Rayleigh backscatter from the pump FWM product in the fiber couples into the forward direction where it is again Raman amplified with the signal. The FWM product is amplified by the Raman pump system 10 along with the signal. This process can occur over multiple fiber spans in the link. Any FWM-induced single Rayleigh backscatter component that overlaps with a channel wavelength must be well below the Amplified Stimulated Emission (ASE) added by the Raman pump system 10 in order not to affect the performance of the system.

Figure 8:
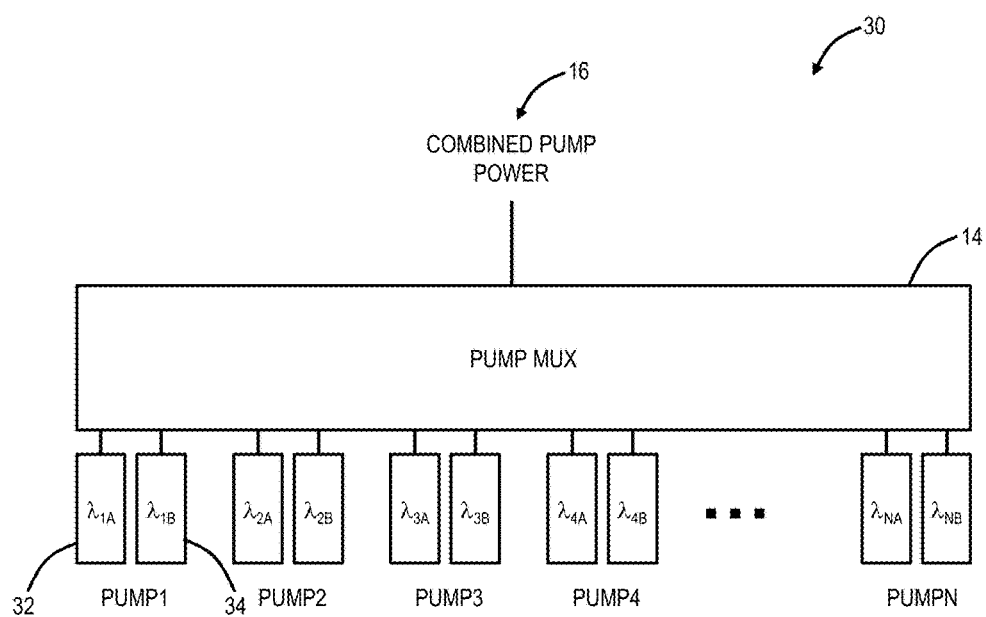
FIG. 8 is a block diagram of a Raman pump which includes secondary pumps for FWM mitigation due to the fiber zero dispersion locations.

FIG. 8 is a block diagram of a Raman pump system 30 which includes primary and secondary pumps for FWM mitigation due to the fiber zero dispersion locations 22. The Raman pump system 30 is similar to the Raman pump system 10 including the pump multiplexer 14 and the output 16. However, the Raman pump system 30 includes primary pumps 32 and secondary pumps 34 that are spaced away in wavelength from the primary pumps 32 wavelength.

The primary pumps 32 have wavelengths designated $\lambda_{1A}$, $\lambda_{2A}$, $\lambda_{NA}$ and the secondary pumps 34 have wavelengths designated $\lambda_{1B}$, $\lambda_{2B}$, . . . , $\lambda_{NB}$. Again, assume the Raman pump system 30 includes N pumps, the Raman pump system 30 would include 2N total pumps 32, 34. Note, only one of each primary pump 32 and secondary pump 34 is in operation at the designated wavelength. For example, for the first pump 1, only one of the pumps 32, 34 is active so only one of the wavelengths $\lambda_{1A}$ or $\lambda_{1B}$ is used in the Raman pump system 30.

In normal operation which is where the fiber zero dispersion location 22 is far away from the primary pump 32, the primary pump 32 would be used. In cases where the primary pump 32 wavelength is close to the fiber zero dispersion location 22, the primary pump 32 (Pump A) would be turned off and the secondary pump 34 (Pump B) is used.

Only a few fiber types have zero dispersion ranges that are problematic for C and L band operation. The commonly deployed fiber types that would have FWM issues include ELEAF and TWC. While FIG. 8 below shows a secondary pump 34 for each primary pump 32, in practice only a few of the primary pumps 32 would require secondary pumps 34. For example, a practical C+L Raman amplifier design could be realized with a total of 7 pumps total, including 3 primary pumps 32 without secondary pumps and 2 pairs of pumps including both primary pumps 32 and secondary pumps 34. Those skilled in the art will recognize practical implementations may omit secondary pumps 34 if the primary pump 32 wavelength is not problematic for FWM. That is, the Raman pump system 30 does not require a secondary pump 34 for every primary pump 32.

With respect to the difference in wavelengths $\lambda_A$, $\lambda_B$ between the primary pump 32 ($\lambda_A$) and the secondary pump 34 ($\lambda_B$), the separation can be at least 2 nm difference, and preferably at least 3 nm difference, and no more than 10 nm difference. Of course, other values are contemplated. However, the primary wavelength and the secondary wavelength are closely related in terms of spacing so that one or the other could be used based on the ZDW.

Figure 9:
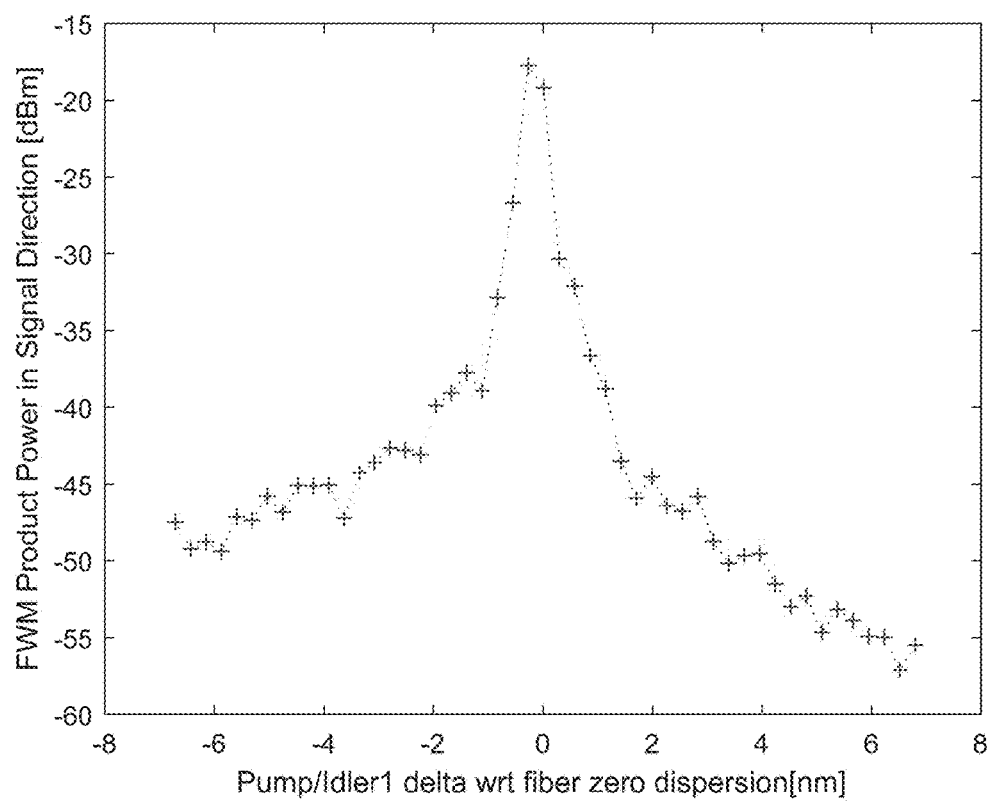
FIG. 9 is a graph of the FWM product backscattered in the direction of the signal as a function of the difference between the pump wavelengths and the fiber zero dispersion for a 100 km section of ELEAF fiber.

FIG. 9 is a graph of the FWM product backscattered in the direction of the signal as a function of the difference between the pump wavelengths and the fiber zero dispersion for a 100 km section of ELEAF fiber. The amount of separation between the primary and secondary pump wavelengths is a trade-off between the acceptable FWM penalty including a margin for temperature dependence and other factors and the additional gain ripple that occurs in the Raman pump system 30. Careful selection of primary and secondary pump wavelengths and randomizing pump wavelength selection in a chain of amplifiers can minimize the accumulated gain ripple.

Note, the fiber zero dispersion location 22 of a deployed fiber can change based on temperature. Based on research, it has been shown that the ZDW could shift +/−1 nm if the ambient temperature changes +/−30 deg. C. (e.g., July versus February). For this reason, the separation of at least 2 nm and preferably at least 3 nm can also compensate for temperature differences.

Three example implementations were evaluated over an NDSF span with 25 dB of loss and with a target Raman gain of 10 dB. The gain flatness was calculated with signals in both the C-Band and L-Band.

Figure 10:
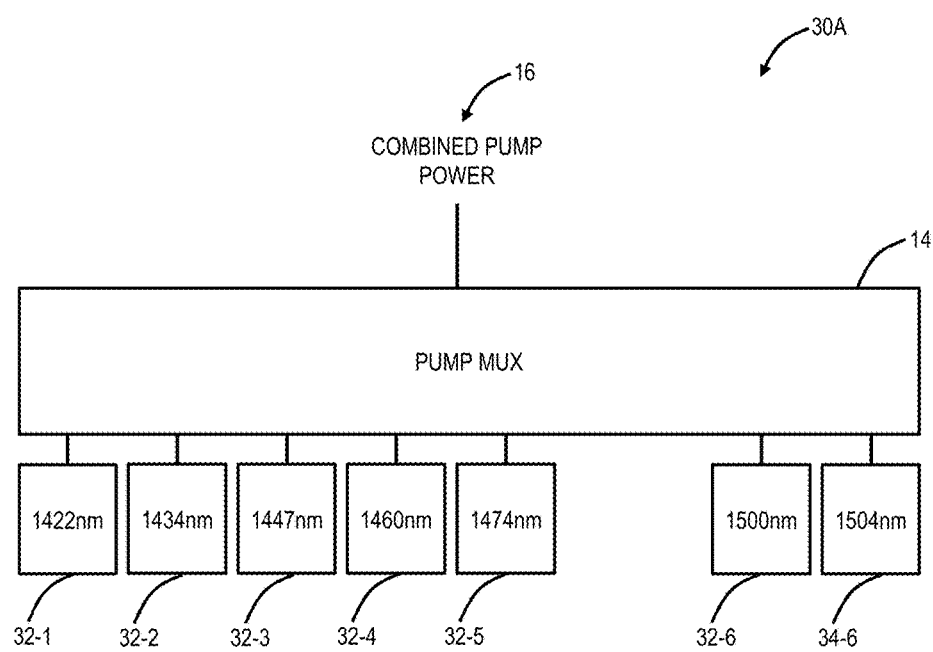
FIG. 10 is a block diagram of a Raman pump with seven total pumps including 6 primary pumps and one secondary pump at 1504 nm.
Figure 11:
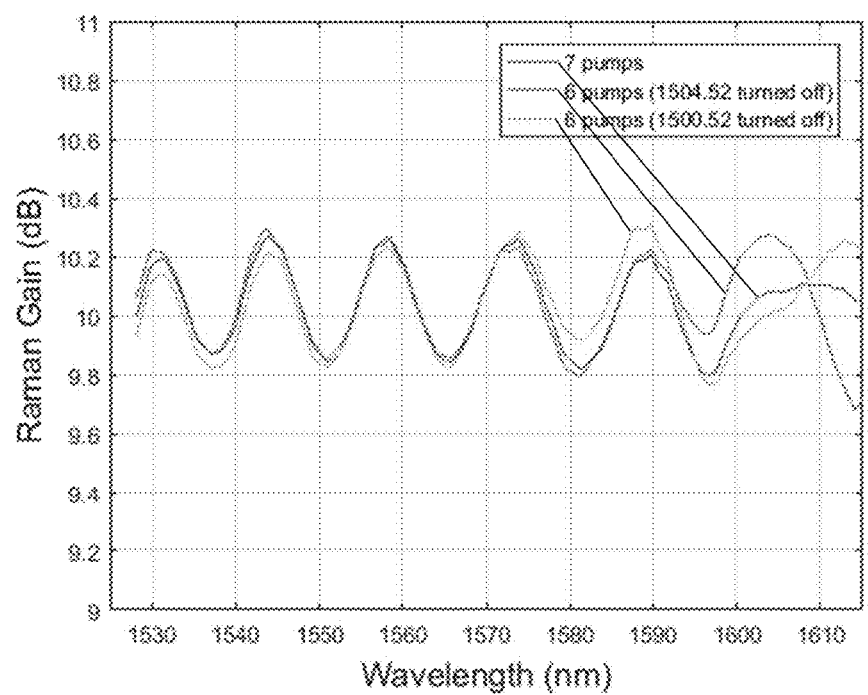
FIG. 11 is a graph of Raman gain versus wavelength for the Raman pump of FIG. 10.

FIG. 10 is a block diagram of a Raman pump system 30A with seven total pumps including 6 primary pumps (labeled as 32-1-32-6) and one secondary pump at 1504 nm (labeled as 34-6). FIG. 11 is a graph of Raman gain versus wavelength for the Raman pump system 30A. Note, the maximum gain is 10.3 dB and the minimum gain is 9.8 dB.

Figure 12:
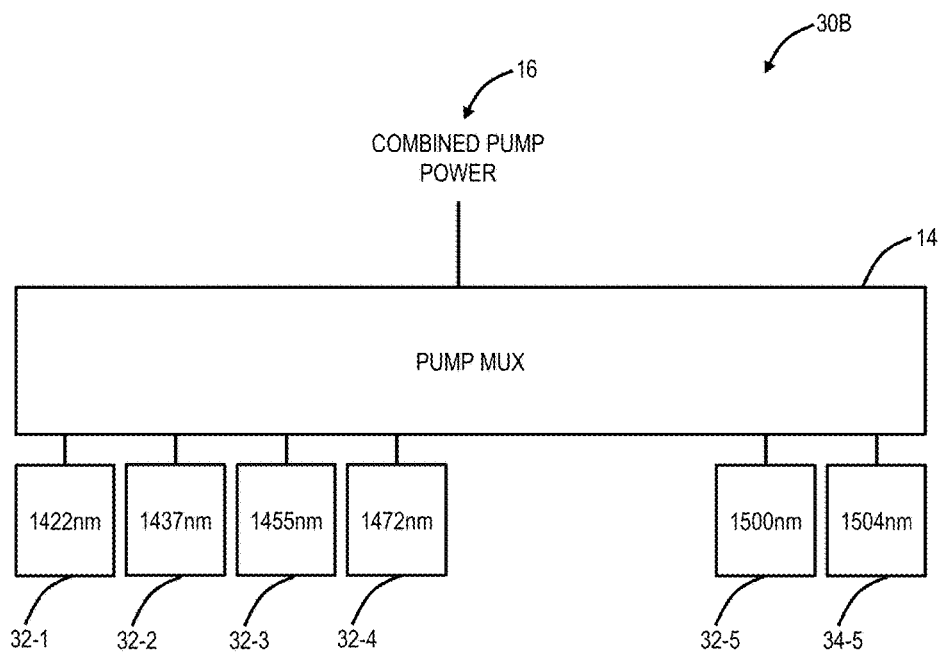
FIG. 12 is a block diagram of a Raman pump with six total pumps including 5 primary pumps and one secondary pump at 1504 nm.
Figure 13:
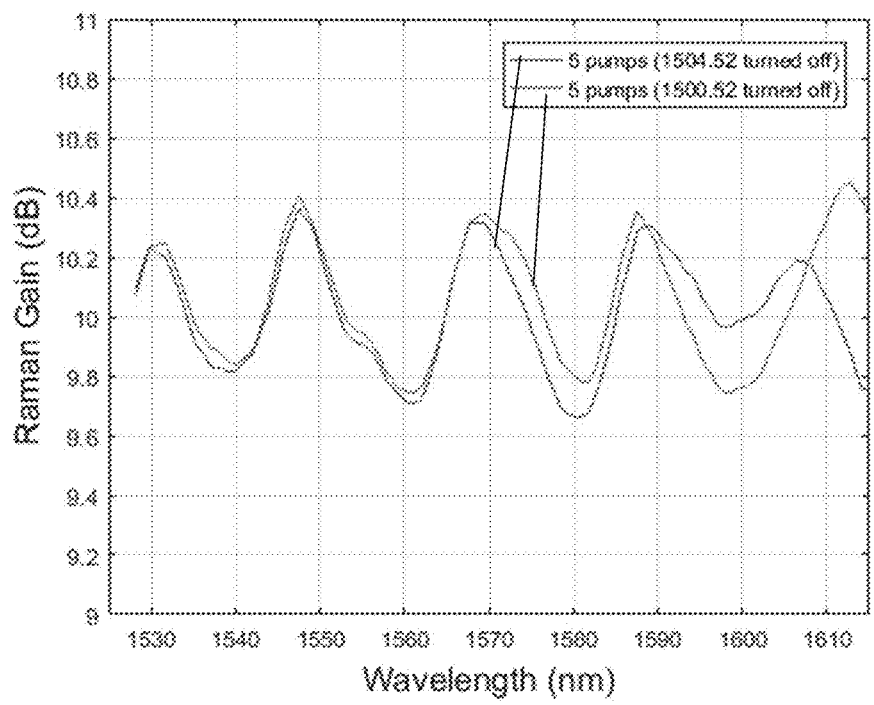
FIG. 13 is a graph of Raman gain versus wavelength for the Raman pump of FIG. 11.

FIG. 12 is a block diagram of a Raman pump system 30B with six total pumps including 5 primary pumps (labeled as 32-1-32-5) and one secondary pump at 1504 nm (labeled as 34-5). FIG. 13 is a graph of Raman gain versus wavelength for the Raman pump system 30B. Note, the maximum gain is 10.36 dB and the minimum gain is 9.66 dB.

Figure 14:
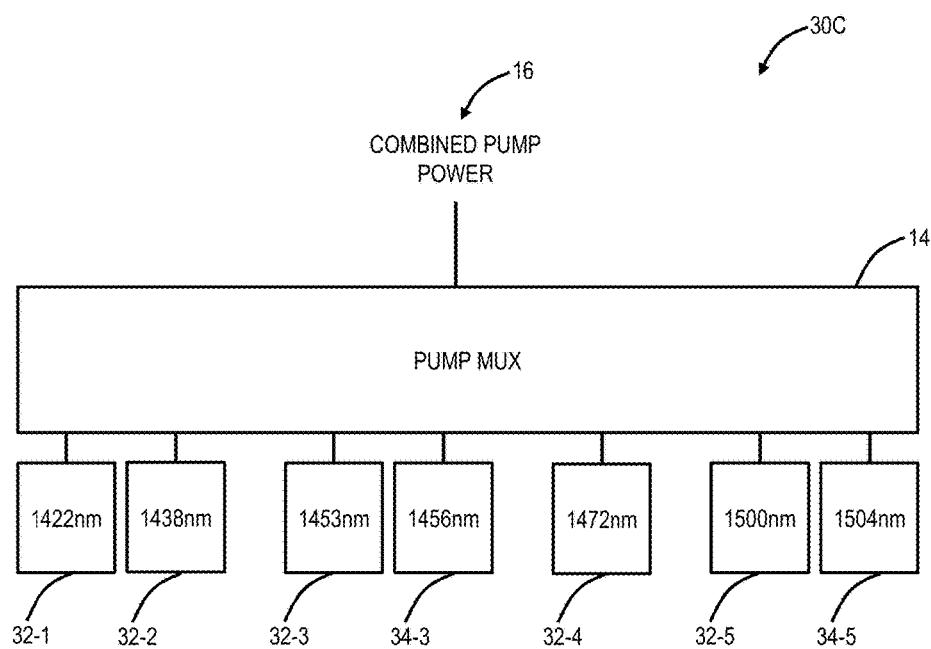
FIG. 14 is a block diagram of a Raman pump with seven total pumps including 5 primary pumps and two secondary pumps at 1456 nm, 1504 nm.
Figure 15:
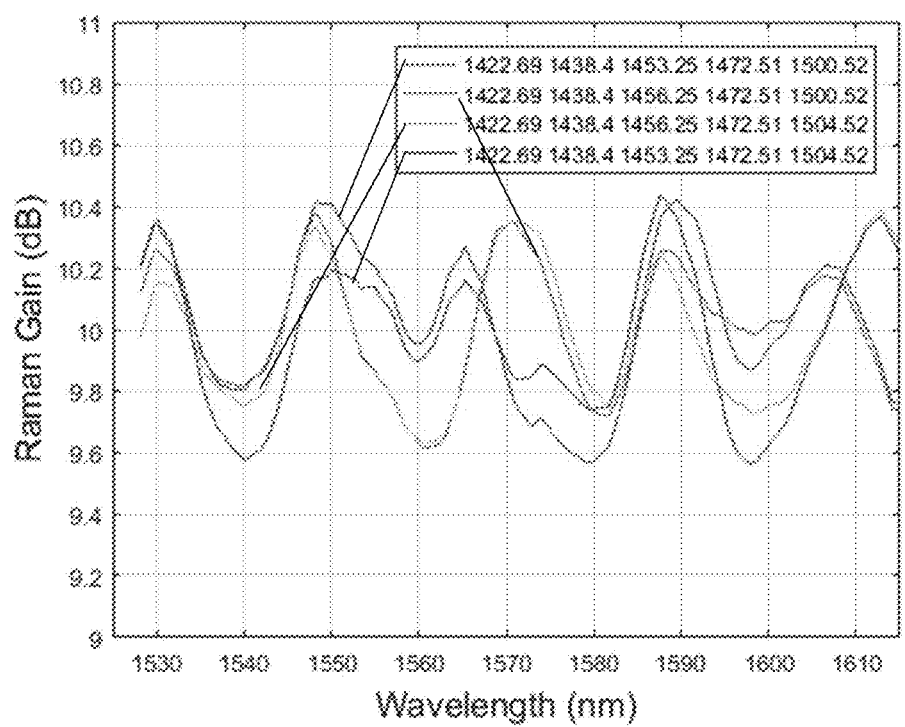
FIG. 15 is a graph of Raman gain versus wavelength for the Raman amplifier.

FIG. 14 is a block diagram of a Raman pump system 30C with seven total pumps including 5 primary pumps (labeled as 32-1-32-5) and two secondary pumps at 1456 nm, 1504 nm (labeled as 34-3, 34-5). FIG. 15 is a graph of Raman gain versus wavelength for the Raman pump system 30C. Note, the maximum gain is 10.4 dB and the minimum gain is 9.6 dB.

Note, the Raman pumps 30A, 30B, 30C include one or two extra pumps 34 that may be inactive. While this modestly increases cost, it enables flexibility to address operational conditions in the field.

The fiber zero dispersion location 22 for a fiber span can be measured directly ahead of network deployment in order to decide which pumps 32, 34 should be used. However, a preferred approach would be to implement an automatic detection mechanism for FWM in order to have the software controlling the Raman pump system 30 be able to automatically make this decision. This can be done using an Optical Channel Monitor (OCM) to measure the optical spectrum generated by the Raman pumps 32, 34 within the signal band, as part of a Raman amplifier turn-up procedure. For each pair of pump wavelengths, the two pumps A and B can be turned on one at a time and the resulting OCM spectra can be compared to determine which of the 2 pumps produces the lowest FWM products within the signal band. One complication of this measurement is that it may be difficult to distinguish between Raman ASE and FWM backscattering, which can be of comparable amplitude. One way to improve the sensitivity of the measurement is to use pump modulation. If two particular pumps 32, 34 are producing a FWM product within the signal band, the idea is to take two OCM measurements, one with the two pumps modulated in phase and another with the two pumps modulated 180 degrees out of phase. The in-phase measurement produces both Raman ASE and FWM within the signal band, while the out-of-phase measurement produces mostly ASE, as the FWM interaction between the two pumps is largely suppressed. The difference between the two OCM measurements therefore provides an estimate of the FWM contribution only.

The OCM is utilized to look for the presence of FWM products in the Raman amplifier output for different pump combinations of the Raman pump system 30. This data is used to select the pump combination in the Raman pump system 30 that minimizes FWM. A separate approach could include measuring the ZDW of the fiber, and from that decide which pump combination to use.

Another technique to mitigate FWM is to modulate the pumps 32, 34 that are producing unwanted FWM products out of phase. Note that the FWM detection described above could also be used to automatically decide which specific pumps 32, 34 should be modulated out of phase in order to minimize the unwanted FWM products.

In an embodiment, a Raman pump 50 includes a plurality of primary Raman pumps 32 each at a corresponding wavelength; and at least one pair of redundant Raman pumps include a primary Raman pump 32 at a primary wavelength and a secondary Raman pump 34 at a secondary wavelength, wherein only one of the primary Raman pump 32 and the secondary Raman pump 34 is configured based on a zero dispersion wavelength location of a fiber over which the Raman pump 50 operates. The secondary wavelength can be separated from the primary wavelength by at least 2 nm or 3 nm and no more than 10 nm. The Raman pump 50 can provide amplification across both the C Band and the L Band. The zero dispersion wavelength can be measured and the at least one pair of redundant Raman pumps are configured based thereon. An Optical Channel Monitor (OCM) can determine a presence of Four Wave Mixing (FWM) products in an output of the Raman amplifier based on different combinations of the at least one pair of redundant Raman pumps, for selection of the at least one pair of redundant Raman pumps.

Optionally, the plurality of primary Raman pumps can include 6 pumps and the at least one pair of redundant Raman pumps includes one primary Raman pump and one secondary Raman pump. Alternatively, the plurality of primary Raman pumps can include 5 pumps and the at least one pair of redundant Raman pumps includes one primary Raman pump and one secondary Raman pump. Additionally, the plurality of primary Raman pumps can include 5 pumps and the at least one pair of redundant Raman pumps includes two primary Raman pumps and two secondary Raman pumps. The at least one pair of redundant Raman pumps can be located at about 1450 nm. The at least one pair of redundant Raman pumps can be located at about 1500 nm.

In another embodiment, a dual C-Band and L-Band Raman pump system 30 includes a plurality of Raman pumps 32, 34 connected to a multiplexer 14, wherein the plurality of Raman pumps include a plurality of primary Raman pumps each at a corresponding wavelength and at least one pair of redundant Raman pumps including a primary Raman pump at a primary wavelength and a secondary Raman pump at a secondary wavelength, wherein one of the primary Raman pump and the secondary Raman pump selectively operates based on a zero dispersion wavelength location of a fiber over which the Raman amplifier operates.

Figure 16:
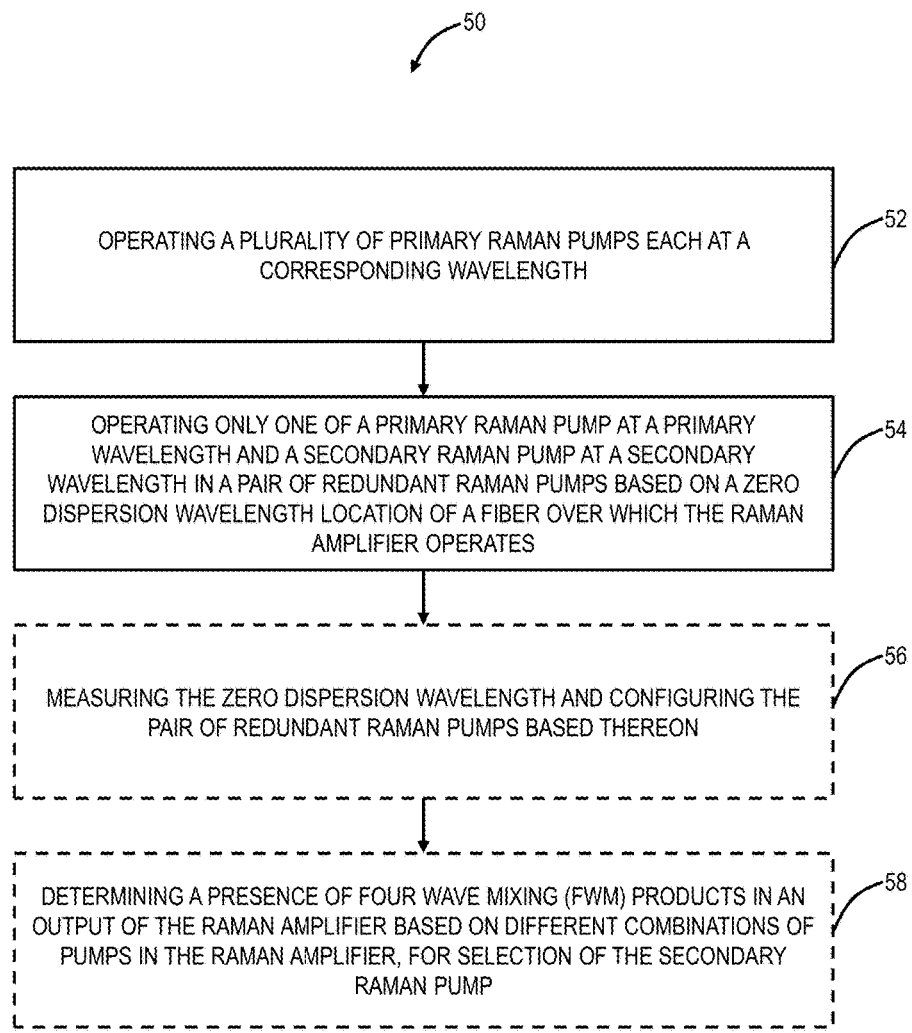
FIG. 16 is a flowchart of a process 50 for operating a Raman pump.

FIG. 16 is a flowchart of a process 50 for operating the Raman pump system 30. The process 50 includes operating a plurality of primary Raman pumps each at a corresponding wavelength (step 52); and operating only one of a primary Raman pump at a primary wavelength and a secondary Raman pump at a secondary wavelength in a pair of redundant Raman pumps based on a zero dispersion wavelength location of a fiber over which the Raman amplifier operates (step 54). The process 50 can further include measuring the zero dispersion wavelength and configuring the pair of redundant Raman pumps based thereon (step 56), and/or determining a presence of Four Wave Mixing (FWM) products in an output of the Raman amplifier based on different combinations of pumps in the Raman amplifier, for selection of the secondary Raman pump (step 58).

The secondary wavelength can be separated from the primary wavelength by at least 2 nm or 3 nm and no more than 10 nm. The Raman amplifier can provide amplification across both the C Band and the L Band. The pair of redundant Raman pumps can be located at about 1450 nm or 1500 nm.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Raman pump system for a Raman amplifier comprising:
    a plurality of primary Raman pumps each at a corresponding wavelength;
    at least one pair of redundant Raman pumps comprising a primary Raman pump at a primary wavelength and a secondary Raman pump at a secondary wavelength, wherein only one of the primary redundant Raman pump and the secondary redundant Raman pump is configured based on a zero dispersion wavelength location of a fiber over which the Raman pump system operates; and
    an Optical Channel Monitor (OCM) configured to determine a presence of Four Wave Mixing (FWM) products in an output of the Raman amplifier based on different combinations of the at least one pair of redundant Raman pumps, for selection of the at least one pair of redundant Raman pumps.

2. The Raman pump system of claim 1, wherein the secondary wavelength is separated from the primary wavelength by at least 2 nm and no more than 10 nm.

3. The Raman pump system of claim 1, wherein the secondary wavelength is separated from the primary wavelength by at least 3 nm and no more than 10 nm.

4. The Raman pump system of claim 1, wherein the Raman amplifier provides amplification across both the C Band and the L Band.

5. The Raman pump system of claim 1, wherein the zero dispersion wavelength is measured and the at least one pair of redundant Raman pumps are configured based thereon.

6. The Raman pump system of claim 1, wherein the plurality of primary Raman pumps comprise 6 pumps and the at least one pair of redundant Raman pumps comprises one primary Raman pump and one secondary Raman pump.

7. The Raman pump system of claim 1, wherein the plurality of primary Raman pumps comprise 5 pumps and the at least one pair of redundant Raman pumps comprises one primary Raman pump and one secondary Raman pump.

8. The Raman pump system of claim 1, wherein the plurality of primary Raman pumps comprise 5 pumps and the at least one pair of redundant Raman pumps comprises two primary Raman pumps and two secondary Raman pumps.

9. The Raman pump system of claim 1, wherein the at least one pair of redundant Raman pumps is located at about 1450 nm.

10. The Raman pump system of claim 1, wherein the at least one pair of redundant Raman pumps is located at about 1500 nm.

11. A method of operating a Raman pump system for a Raman amplifier comprising:
    operating a plurality of primary Raman pumps each at a corresponding wavelength;
    operating only one of a primary redundant Raman pump at a primary wavelength and a secondary redundant Raman pump at a secondary wavelength in a pair of redundant Raman pumps based on a zero dispersion wavelength location of a fiber over which the Raman pump system operates; and
    determining a presence of Four Wave Mixing (FWM) products in an output of the Raman amplifier based on different combinations of pumps in the Raman amplifier, for selection of the redundant Raman pump.

12. The method of claim 11, wherein the secondary wavelength is separated from the primary wavelength by at least 2 nm and no more than 10 nm.

13. The method of claim 11, wherein the secondary wavelength is separated from the primary wavelength by at least 3 nm and no more than 10 nm.

14. The method of claim 11, wherein the Raman amplifier provides amplification across both the C Band and the L Band.

15. The method of claim 11, further comprising:
    measuring the zero dispersion wavelength and configuring the pair of redundant Raman pumps based thereon.

16. The method of claim 11, wherein the pair of redundant Raman pumps is located at about 1450 nm.

17. The method of claim 11, wherein the pair of redundant Raman pumps is located at about 1500 nm.

18. A dual C-Band and L-Band Raman pump system for a Raman amplifier, comprising:
    a plurality of Raman pumps connected to a multiplexer, wherein the plurality of Raman pumps comprise a plurality of primary Raman pumps each at a corresponding wavelength and at least one pair of redundant Raman pumps comprising a primary redundant Raman pump at a primary wavelength and a secondary redundant Raman pump at a secondary wavelength, wherein one of the primary redundant Raman pump and the secondary redundant Raman pump selectively operates based on a zero dispersion wavelength location of a fiber over which the Raman pump system operates, and
    wherein an Optical Channel Monitor (OCM) determines a presence of Four Wave Mixing (FWM) products in an output of the Raman amplifier based on different combinations of the at least one pair of redundant Raman pumps, for selection of the at least one pair of redundant Raman pumps.

19. The dual C-Band and L-Band Raman pump system of claim 18, wherein the secondary wavelength is separated from the primary wavelength by at least 2 nm and no more than 10 nm.

20. The dual C-Band and L-Band Raman pump system of claim 18, wherein the zero dispersion wavelength is measured and the at least one pair of redundant Raman pumps are configured based thereon.

* * * * *